United States Patent Office 3,375,246
Patented Mar. 26, 1968

3,375,246
ISOINDOLINES
Goetz E. Hardtmann, Madison, and Hans Ott, Convent Station, N.J., assignors to Sandoz, Inc., Hanover, N.J.
No Drawing. Filed June 11, 1965, Ser. No. 463,378
20 Claims. (Cl. 260—239.3)

The present invention is directed to pharmaceutically acceptable isoindolobenzodiazepinones, particularly those of the formula

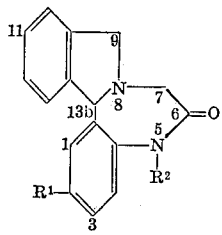

wherein:
$R^1$ is either a hydrogen atom (—H); a chlorine atom (—Cl); a flourine atom (—F); or a bromine atom (—Br);
$R^2$ is either a hydrogen atom (—H) or $R^3$; and
$R^3$ is either lower alkyl, e.g. methyl, ethyl, propyl, isopropyl and butyl; lower alkenyl having a saturated α-carbon atom, e.g. allyl; lower alkinyl having a saturated α-carbon atom, e.g. propargyl; or di-lower)alkyl-amino(lower)alkyl having an akylene bridge of at least two carbon atoms, e.g. β-dimethylaminoethyl and γ-(N-ethyl-N-methyl)aminopropyl; and acid addition salts thereof.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. on alkanesulfonic acid, such as methanesulfonic acid ($H_3C$—$SO_3H$); dibasic acids, e.g. succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicyclic acid and arylsulfonic acids, such as benzenesulfonic acid. The only limitation on the acid selected is that the resulting acid addition salt be pharmaceutically acceptable; the acid does not nullify the therapeutic properties of compounds I. It is preferred, however, to select an acid so that the salt therewith is water-soluble; tartaric acid and succinic acid are preferred for this purpose.

Each compound I has an asymmetric carbon atom (13b) and thus exists as a racemate or in an optically active form. Each of the optical antipodes (enantiomers) is within the scope of this invention. Resolution of racemates into optical antipodes is effected according to procedures well-known to the art-skilled and does not, per se, constitute the essence of the instant invention.

Compounds I are prepared according to the following reaction scheme:

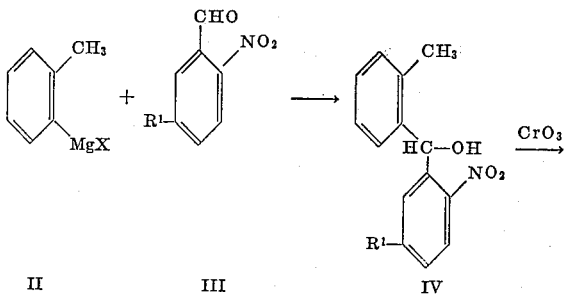

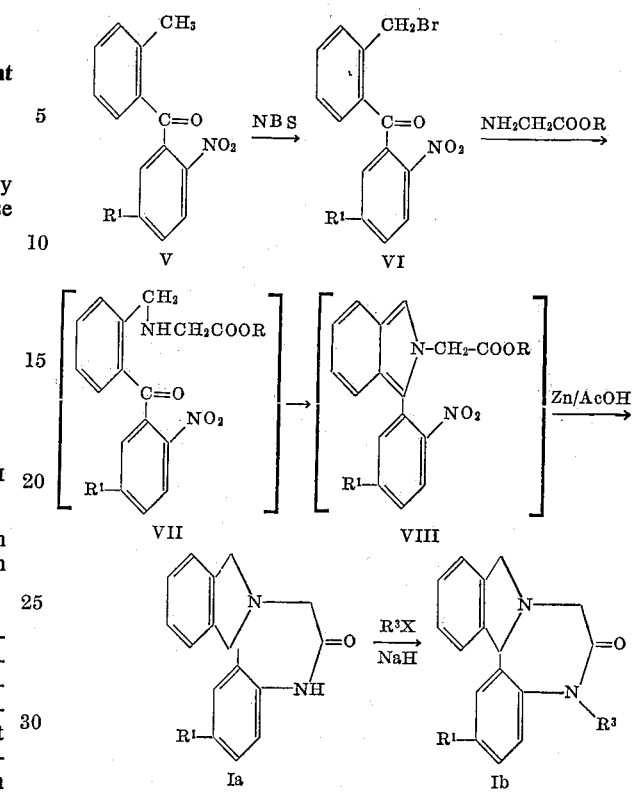

wherein:
R is either methyl or ethyl;
X is either a chlorine atom (—Cl), a bromine atom (—Br) or an iodine atom (—I); and each of
$R^1$, $R^2$ and $R^3$ has its above-ascribed meaning.

The Gignard reaction between the o-tolyl-magnesium iodide II and o-nitrobenzaldehyde III is carried out in dry toluene. The dry toluene can be replaced by another inert solvent, such as benzene, tetrahydrofurane and diethylether.

Oxidation of IV with chromic acid in acetic acid leads in high yield to the benzophenone V which, on bromination with N-bromo-succinimide (NBS) in an inert solvent, such as carbon tetrachloride, yields the bromoethylbenzophenone VI.

On reaction of VI with glycine ester at 0° C. under nitrogen atmosphere, a dark blue product (VIII) forms which cannot be isolated in pure form, but is directly reduced with zinc and acetic acid to the highly crystalline isoindolobenzodiazepine Ia. The hydrogen atom at $N_5$ of Ia is readily replaced by $R^3$ according to well-known procedures.

Acid addition salts of compounds I are prepared from free bases Ia and Ib according to standard well-known procedures.

Compounds I and their pharmaceutically acceptable acid addition salts are useful as sedatives, sedative/hyponotics, tranquilizers, anticonvulsants and antidepressants. They are administered either orally or parenterally in standard dosage forms, e.g. tablets and capsules, in daily doses of from 30 to 200 milligrams.

Each of the pharmaceutically active compounds of this invention may be, e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

| | Parts |
|---|---|
| Title compound of Example 6 | 50 |
| Tragacanth | 2 |
| Lactose | 39.5 |
| Corn starch | 5 |
| Talcum | 3 |
| Magnesium stearate | 0.5 |
| Alcohol SD–30 | q.s. |
| Purified water | |

The following examples illustrates the invention, all temperatures being in degrees centigrade, parts and percentages being by weight unless otherwise specified, and the relationship between parts by weight and parts by volume being the same as that between the kilogram and the liter.

EXAMPLE 1

*5-chloro-2'-methyl-2-nitro-benzhydrol*

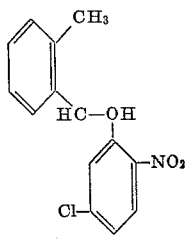

Add a solution of 26 parts of o-toyly magnesium iodide in 300 parts by volume of diethylether to the solution of 15 parts of 5-chloro-2-nitro-benzaldehyde in 200 parts by volume of dry toluene at —65°. Stir for 3 hours at this temperature, then raise the temperature to —10° and add slowly 20 parts by volume of saturated ammonium chloride solution. Acidify the aqueous phase with dilute hydrochloric acid. Separate the organic phase and extract the aqueous phase twice with benzene. Wash all the organic layers several times with water. Collect the thus obtained organic phase, dry over sodium sulfate and evaporate the solvents in vacuo. Crystallize from diethylether to obtain 11 parts of the title compound, M.P. 130° to 132°.

Replacing the 5-chloro-2-nitro-benzaldehyde with an equivalent of either 2-nitrobenzaldehyde, 5-bromo-2-nitro-benzaldehyde or 5-fluoro-2-nitro-benzaldehyde results in the preparation, in similar manner, of the corresponding compound IV.

EXAMPLE 2

*5-chloro-2'-methyl-2-nitro-benzophenone*

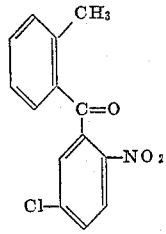

Add a suspension of 6.5 parts of chromium trioxide in 40 parts by volume of glacial acetic acid over a period of thirty minutes to a boiling solution of 9.5 parts of 5-chloro-2'-methyl-2-nitro-benzhydrol in 40 parts by volume of glacial acetic acid. Continue boiling for another fifteen minutes. After cooling add the thus-obtained reaction mixture to 500 parts by volume of water whereby 9 parts of the title compound precipitate out in yellow prisms, M.P. 115° to 116°.

Replacing the 5 - chloro-2'-methyl-2-nitro-benzhydrol with an equivalent of either 2-methyl-2'-nitro-benzhydrol, 5-bromo-2'-methyl-2-nitro-benzhydrol or 5-fluoro-2'-methyl-2-nitro-benzhydrol results in the preparation, in similar manner, of the corresponding compound V.

EXAMPLE 3

*2'-bromomethyl-5-chloro-2-nitro-benzophenone*

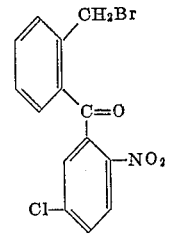

Reflux a mixture of 3.6 parts of 5-chloro-2'-methyl-2-nitro-benzophenone, 2.5 parts of N-bromosuccinimide and 0.1 part of dibenzoylperoxide in 35 parts by volume of carbon tetrachloride for 3 hours. Dilute the thus-obtained mixture with methylene chloride; wash the organic phase twice with water; dry same over sodium sulfate and evaporate the solvents in vacuo. Crystallize the residue from methylene chloride/diethylether to obtain 2.2 parts of the title compound as yellow prisms, M.P. 137° to 139°.

Replacing the 5-chloro-2'-methyl-2-nitro-benzophenone with an equivalent of either 2-methyl-2'-nitro-benzophenone, 5-bromo-2'-methyl-2-nitro-benzophenone or 5-fluoro-2'-methyl-2-nitro-benzophenone results in the preparation, in similar manner, of the corresponding compound VI.

EXAMPLE 4

*2-carbethoxymethyl-1-(5-chloro-2-nitro-phenyl)-isoindole*

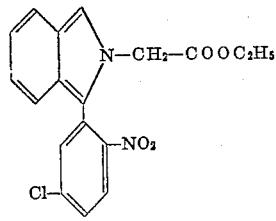

Dissolve 1.8 parts of 2'-bromomethyl-5-chloro-2-nitrobenzophenone and 1 part of glycine ethyl ester in 40 parts by volume of chloroform and 500 parts by volume of ethanol. Stir this mixture for 48 hours in a nitrogen atmosphere at a temperature of 0° to 5°. Evaporate the solvent in vacuo and use the thus-obtained crude reaction product in Example 5.

Replacing the 2'-bromomethyl-5-chloro-2-nitro-benzophenone with an equivalent of either 2-bromomethyl-2'-nitro-benzophenone, 2'-bromomethyl-5-bromo-2-nitrobenzophenone or 2'-bromomethyl-5-fluoro-2-nitro-benzophenone results in the preparation, in similar manner of the corresponding compound VII. Replacing the glycine ethyl ester with an equivalent of glycine methyl ester results in the preparation, in similar manner, of 2-carbomethoxymethyl-1-(5-chloro-2-nitro-phenyl)-isoindole.

EXAMPLE 5

*2-chloro-9,13b-dihydro-5H-isoindolo[2,1-d] [1,4]benzodiazepin-6(7H)-one*

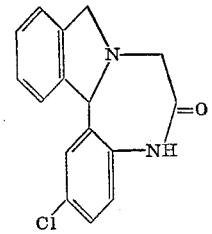

Dissolve the crude reaction product from Example 4 in 100 parts by volume of acetic acid; add thereto 4 parts of zinc dust and stir the thus-obtained mixture for 3 hours at room temperature (20°). Filter off the unreacted zinc; evaporate the filtrate in vacuo; dissolve the resulting residue in chloroform and wash the organic phase with 2 N sodium carbonate solution and with water. Concentrate the dried organic phase to 10 parts by volume whereby 0.6 part of the title compound crystallizes, M.P. 258° to 260°.

Replacing the crude mixture from Example 4 with an equivalent of 2-carbomethoxymethyl-1-(5-chloro-2-nitrophenyl)-isoindole results in the preparation, in similar manner, of the title compound. Replacing the crude mixture from Example 4 with an equivalent of either 2-carbethoxymethyl - 1 - (2 - nitro - phenyl) - isoindole, 2 - carbethoxymethyl-1-(5-bromo-2-nitro-phenyl)-isoindole or 2-carbethoxymethyl - 1 - (5-fluoro - 2 - nitro - phenyl) - isoindole results in the preparation, in similar manner, of the corresponding compound Ia.

EXAMPLE 6

*2-chloro-5-methyl-9,13b-dihydro-5H-isoindolo[2,1-d][1,4]benzodiazepin-6(7H)-one*

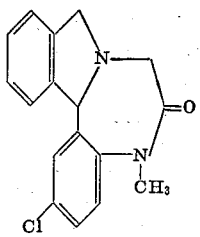

Dissolve 6 parts of 2-chloro-9,13b-dihydro-5H-isoindolo[2,1-d][1,4]benzodiazepin-6(7H)-one in 200 parts by volume of absolute dimethylformamide and add at 60° 1.3 parts of sodium hydride (56% in mineral oil). Heat to 70° and add after 30 minutes 4.3 parts of methyl iodide. Stir for one hour at 50° to 60° and then add water. Evaporate the reaction mixture to dryness in vacuo, dissolve the residue in 300 parts by volume of methylene chloride. Wash this solution with water, dry the organic phase over sodium sulfate and evaporate the solvent in vacuo. Dissolve the resulting residue in diethylether/methylene chloride, and saturate the filtered solution with dry hydrogen chloride gas, whereby 3 parts of the title compound precipitate out as its hydrochloride, M.P. 263° to 268°. The base is freed by standard procedures and melts at 165° to 172°.

Replacing the methyl iodide by an equivalent of either ethyl iodide, propyl iodide, allyl bromide, propargyl bromide, 2-chloro-1-dimethylaminoethane, 3-chloro-1-(N-methyl-N-ethyl)aminopropane, 1-chloro-2-diethylaminopropane or 3-chloro-1-dimethylaminopropane results in the preparation, in similar manner, of the corresponding compound Ib. Replacing the title compound of Example 5 with an equivalent of either 9,13b-dihydro-5H-isoindolo[2,1-d][1,4]benzodiazepin-6(7H)-one, 2-bromo-9,13b - dihydro - 5H - isoindolo[2,1 - d][1,4]benzodiazepin-6(7H)-one or 2-fluoro-9,13b-dihydro-5H-isoindolo[2,1-d][1,4]benzodiazepin-6(7H)-one results in the preparation, in similar manner, of the corresponding compound Ib.

The invention and its advantages are readily understood from the foregoing description. Various changes may be made in the intermediates and in the final products (including the pharmaceutically acceptable acid addition salts) without departing from the spirit and scope of the invention or sacrificing its material advantages. The examples presented herein are merely illustrative embodiments.

What is claimed is:

1. A pharmaceutically acceptable compound of the formula

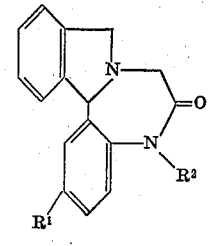

wherein:

$R^1$ is a member selected from the group consisting of a hydrogen atom, chloro, fluoro and bromo; and $R^2$ is a member selected from the group consisting of a hydrogen atom, lower alkyl, lower alkenyl having a saturated α-carbon atom, lower alkinyl having a saturated α-carbon atom and di(lower)alkylamino(lower)-alkyl having an alkylene bridge of at least two carbon atoms.

2. A pharmaceutically acceptable acid addition salt of a compound according to claim 1.

3. The compound of the formula

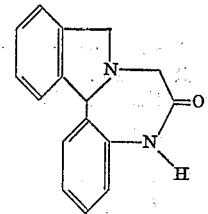

4. A pharmaceutically acceptable member selected from the group consisting of a compound of the formula

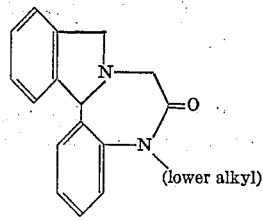

and an acid addition salt thereof.

5. The compound of the formula

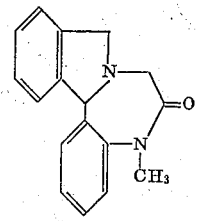

6. A pharmaceutically acceptable member selected from the group consisting of a compound of the formula

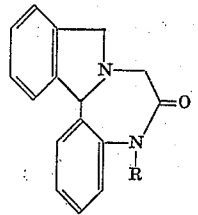

wherein

R is lower alkenyl having a saturated α-carbon atom, and an acid addition salt thereof.

7. The compound of the formula

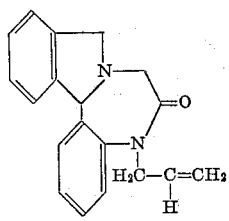

8. A pharmaceutically acceptable member selected from the group consisting of a compound of the formula

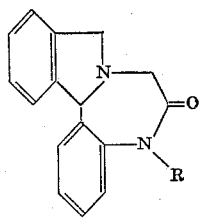

wherein

R is lower alkinyl having a saturated α-carbon atom, and an acid addition salt thereof.

9. The compound of the formula

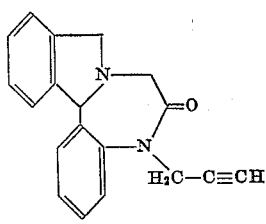

10. A pharmaceutically acceptable member selected from the group consisting of a compound of the formula

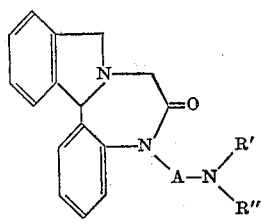

wherein

A is a lower alkylene bridge having a chain of at least 2 carbon atoms between the dialkylamino nitrogen and $N_5$; and each of
R' and R'' is lower alkyl; and an acid addition salt thereof.

11. The compound of the formula

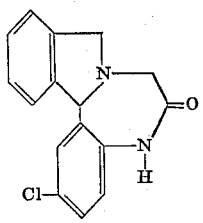

12. A pharmaceutically acceptable member selected from the group consisting of a compound of the formula

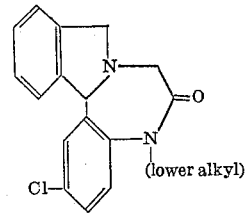

and an acid addition salt thereof.

13. The compound of the formula

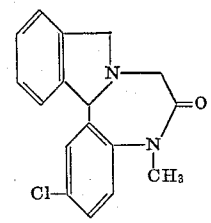

14. A pharmaceutically acceptable member selected from the group consisting of a compound of the formula

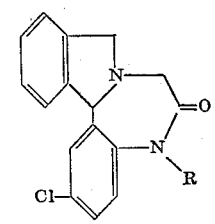

wherein

R is lower alkenyl having a saturated α-carbon atom, and an acid addition salt thereof.

15. The compound of the formula

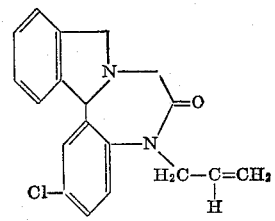

16. A pharmaceutically acceptable member selected from the group consisting of a compound of the formula

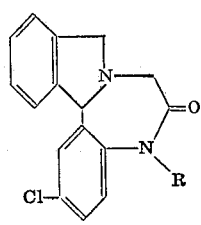

wherein

R is lower alkinyl having a saturated α-carbon atom, and an acid addition salt thereof.

17. The compound of the formula

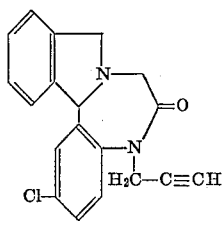

18. A pharmaceutically acceptable member selected from the group consisting of a compound of the formula

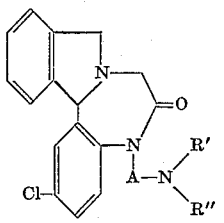

wherein

A is a lower alkylene bridge having a chain of at least 2 carbon atoms between the dialkylamino nitrogen and $N_5$; and each of R' and R" is lower alkyl; and an acid addition salt thereof.

19. The compound of the formula

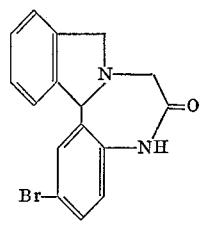

20. The compound of the formula

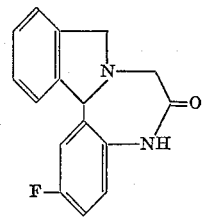

References Cited
UNITED STATES PATENTS
3,261,828  7/1966  Uskokovic et al. ___ 260—239.3

JOHN D. RANDOLPH, Primary Examiner.
R. T. BOND, Assistant Examiner.